United States Patent [19]
Seth

[11] 3,814,176

[45] June 4, 1974

[54] FIXED-FLUIDIZED BED DRY COOLING TOWER

[76] Inventor: Ram Gopal Seth, 1112 Yardley Rd., Cherry Hill, N.J. 08034

[22] Filed: Jan. 22, 1973

[21] Appl. No.: 325,225

[52] U.S. Cl. ............... 165/104, 122/4 D, 165/122
[51] Int. Cl. ........................................... F28d 13/00
[58] Field of Search ............ 165/104, 122; 122/4 D

[56] References Cited
UNITED STATES PATENTS

| | | | |
|---|---|---|---|
| 2,818,236 | 12/1957 | Blaskowski | 122/4 D X |
| 2,983,259 | 5/1961 | Wittke | 122/4 D |
| 3,565,022 | 2/1971 | Bishop | 110/28 J |
| 3,645,237 | 2/1972 | Seth | 122/4 D |

FOREIGN PATENTS OR APPLICATIONS 638,405  3/1962  Canada .............................. 122/4 D

*Primary Examiner*—Albert W. Davis, Jr.
*Attorney, Agent, or Firm*—Charles F. Duffield

[57] ABSTRACT

A forced draft dry cooling tower is disclosed wherein the medium to be cooled passes through heat exchanger tubes embedded within a bed of inert particles composed of smaller particles surrounding and embedded in much larger particles. The forced draft through the cooling tower fluidizes the smaller particles but not the larger particles which stabilize the fluidization of the smaller particles and enhance the fluidization and heat exchange effect thereof.

3 Claims, 1 Drawing Figure

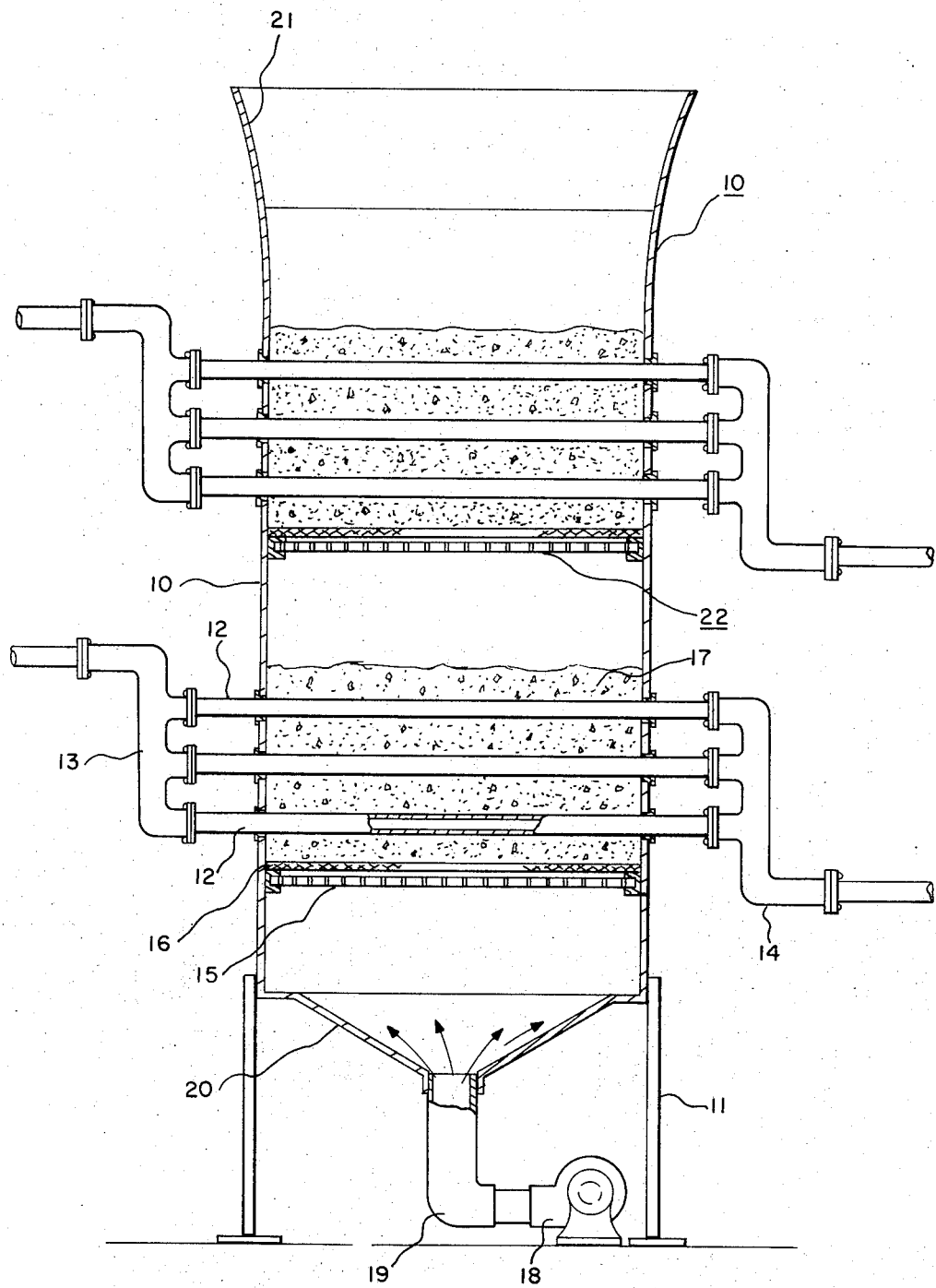

FIXED-FLUIDIZED BED DRY COOLING TOWER

BACKGROUND OF INVENTION

There are fundamentally two different types of cooling systems in use in power plants today. The first is the once through cooling systems, the second is the wet cooling tower and the second is the dry cooling tower.

The once through cooling system is most generally one of the form in which water from a lake or a river is used in a conventional shell and tube condenser through which the medium to be cooled passes. The water from the river is normally passed through the condenser only once and then returned to the ecologically constrained river or the body of water from which it was drawn.

The once through cooling systems are extremely efficient due to their high coefficient of heat transfer and, as well, relatively inexpensive to construct and operate in respect to other forms of cooling towers. However, increasing numbers of such cooling systems located along the banks of rivers and streams have given rise to the problem of thermal polution which has generated a trend away from such cooling systems. Additionally, many industries are located in geographic positions such that lakes and rivers are not available for the operation of such systems.

Wet cooling towers are of the type employingbaffles over which the liquid to be cooled passes and usually fans which blow air extracted from the atmosphere in a counter flow direction across the baffles to effect heat transfer between the liquid and the water. This type of cooling tower is used for reasons of water economy. However, such towers have environmental drawbacks in that they can cause ground fog, icing and salt drift in those cases where a saline solution is used.

The dry type cooling tower is generally a structure in which the medium to be cooled is passed through a plurality of finned heat exchanger tubes over which air is circulated. The circulation of the air may be by means of natural convection or induced or forced draft.

The dry cooling towers have many drawbacks. One such drawback is the extremely large physical size of the dry cooling towers as compared to wet cooling towers of equal capacity. The large size of the dry cooling towers creates problems in respect to space within which they are to be constructed or confined and also due to their large size they become expensive to construct and maintain.

Another serious drawback of the dry cooling tower is the inherent inefficiencies of the unit. The induced or forced draft fan types suffer the penalty of the expense of operation of the blower equipment. Additionally, the coefficient of heat transfer from the air to the finned condenser tubes is extremely low in the dry cooling tower which contributes to inefficiencies in operation, especially in the requirements of increased turbine back pressures which must be maintained where a dry cooling tower is used. Such increased back pressures entail a loss of power generating capability and likewise contribute to the inefficiencies of the entire power plant.

The geographic and environmental problems of the wet cooling towers and the cost and inefficiencies of the dry cooling towers have led the industry in the search for revised, hybrid or new systems which will resolve the problem. Various solutions have been proposed. One such proposal has been to modify the dry cooling tower by surrounding the heat exchanger tubes with an inert material such as sand. The sand is fluidized by the cooling air passing through the tower and acts as an intermediary to abstract the heat from the heat exchanger tubes and in turn lose the heat to the cooling air with the effect of increased overall heat transfer coefficient.

Fluidized bed dry cooling towers are relatively new to the art. Initial investigations made on such towers have revealed that such purely fluidized bed cooling towers possess certain advantages but do not present, as yet, a satisfactory solution. The coefficient of heat transfer is increased in the purely fluidized bed tower, but at the cost of increased pumping power through the system. Additionally, entrainment and loss of the fluidized medium by the cooling air presents a considerable problem in the purely fluidized bed dry cooling tower. Another problem encountered is the stability of the fluidized bed which results in defluidization of the fluidized bed. Further problems are channeling of the fluidized medium and erosion of the tubes under the turbulent mixing conditions of the bed. The high level of noise generated by the purely fluidized bed dry cooling tower creates additional environmental problems.

OBJECT AND SUMMARY OF INVENTION

It is the object of the present invention to provide a fluidized bed dry cooling tower incorporating improvements and advantages in the fluidized bed to overcome the problems and disadvantages of fluidized bed dry cooling towers heretofore known.

The present invention accomplishes the foregoing object of improvement of fluidized bed dry cooling towers by the utilization of larger fixed particles interdisbursed within the fluidized bed. During operation of the cooling tower during which the bed is fluidized, the larger particles remain fixed and are not fluidized. The larger particles increase the stability of the bed by curtailing the defluidization tendency, thus improving the heat transfer coefficient and, as well, reduce the noise level and the loss of fluidized particles by curtailing entrainment.

Other objects and advantages of the present invention will become apparent from the detailed description thereof which follows taken in conjunction with the drawing.

DESCRIPTION OF DRAWING

The sole FIGURE is a side view, partially in section, of the fixed-fluidized bed dry cooling tower of the present invention.

DETAILED DESCRIPTION OF INVENTION

The fixed-fluidization bed dry cooling tower of the present invention is shown in the FIGURE of the drawing. The tower includes an outer casing 10 which is generally supported upon a structural framework 11. The outer casing 10 may be of any desired configuration but is, preferably, circular.

A plurality of smooth surfaced heat exchanger tubes 12 pass through the casing 10 of the cooling tower. The heat exchanger tubes 12 are aligned in vertical tiers and may include one or more horizontally disposed tubes in each tier as required. The tubes are connected in communication with an inlet header 13 and exit header 14.

An air distributor plate 15 is positioned below the lowest tier of heat exchanger tubes 12 and encompass the entire area of the casing. A supporting screen 16 is positioned immediately above the distributor plate 15 and likewise covers the entire inner area of the casing.

The distributor plate 15 and the screen 16 provide the support for a mass of inert granular material 17 which is disposed around the entirety of the heat exchanger tubes 12 and extends slightly above the uppermost tier. The bed of granular materials 17, for example sand and gravel, consist of essentially two different sizes of material. The first size is extremely small from in the neighborhood of 0.001 inch to 0.10 inch in diameter. The larger particles are generally in the range of from 0.25 to 0.50 inches in diameter.

A blower and motor 18 are positioned beneath the casing 10. The blower is connected through ducting 19 to a diffusion nozzle 20. The nozzle 20 is connected immediately below the distributor plate 15.

When the blower 18 is operated, the force draft created will be passed through the distributor plate 15 and screen 16 into the mass of sand and gravel 17. At a given velocity of air through the mass, the smaller particles will become fluidized in the interstices of the tubes and the bigger sized particles. The fluidized smaller particles will engage the heat transfer tubes thus absorbing the heat from the fluid passing within the tubes. As the particles continue in their turbulence, they will be cooled by the air or engage the larger particles transferring their heat to those particles which in turn are cooled by the passing air. The entire turbulent process serves to increases the coefficient of heat transfer from the heat exchanger tubes to the particles by the scrubbing action which reduces the thickness of the thermal boundary layer along the outside surface of the heat exchanger tubes. In a like manner, the thermal coefficient of heat transfer between the particles and the air is increased by the turbulent action.

The larger particles interdisbursed within the fluidized particles add stability to the overall fluidization process. This increased stability is manifest in a more uniform fluidization and an increased turbulent state throughout the fluidized bed which results in increased scrubbing action and coefficient of heat transfer. Additionally, the increased stability of the fluidized bed results in less entrainment and loss of the fluidized particles from the bed.

If desired, an entire second stage or fluidization bed 22 may be positioned above the first bed. Additionally, the top portion of the casing 10 of the cooling tower may be outwardly flared to reduce the velocity of the discharged air to further assure any entrained particles will not leave the cooling tower.

The fixed-fluidized dry cooling tower described above and shown in the FIGURE provides a practical operating dry cooling tower. A cooling tower such as this employing the fixed-fluidized bed demonstrates numerous advantages over the straight dry cooling tower. The coefficient of heat transfer is, on the average, doubled in the fixed-fluidized bed cooling tower over the conventional dry cooling tower. This means that the tube surface area required can be at least cut in half with the consequent reduction in size of the cooling tower coil section. Additionally, the fixed-fluidized bed requires only smooth surface coils and does not necessitate the fins on the coils as in the case of the dry cooling tower. Finned coils run on an average of five times the cost of a smooth coil. Accordingly, the overall construction cost of a fixed-fluidized bed cooling tower may be in the order of one-fifth the cost of the dry cooling tower.

Another advantage obtained in the fixed-fluidized bed cooling tower is the ability of the bed to retain heat. This feature provides a more uniform heat balance in the cooling tower and avoids such problems as requirements for drainage of the coils etc. during the periods of shutdown and extremely cold weather. Additionally, problems of super cooling of the condensate are also avoided.

One penalty which the fixed-fluidized bed cooling tower experiences over the dry cooling tower is the fan or blower requirements which are necessarily increased due to the increased pressure drop through the fluidized bed. However, the greatly increased efficiency of the fixed-fluidized bed over the dry cooling tower renders this minor penalty almost negligible.

The actual performance of the fixed-fluidized bed cooling tower over the dry cooling tower depends on a number of variables. One such variable is the fluidizing medium employed. The specific heat, thermal conductivity, viscosity and dry bulb temperature of the fluidizing medium determine the amount of heat carried out from the fixed-fluidized bed by every pound of fluidizing air. For most cases, atmospheric air is employed.

Another variable in the fixed-fluidized bed is the nature of the fluidized particles. The size of the particles, thermal conductivity and specific heat determine the rate of heat transfer from the heat exchanger surface to the fluidizing particles and, in turn, from the fluidizing particles to the air. The heat transfer coefficient from the heat exchanger to the particles is enhanced by higher ratios of specific heat and densities of the fluidized particles and the fluidized medium. The particle size in the fluidized bed can vary from 0.1 inch to 0.001 inch although an optimum range is in the area of −30 to +40 mesh. The particle composition may be the ordinary sand, silicon carbide, aluminum oxide and other such materials.

A third variable in the fixed-fluidized bed is the nature of the fixed particles. Here again, the size of the particles, their specific heat and the thermal conductivity of the particles determine the rate of mixing of the fluidized particles in the fluidized bed as well as the heat retaining and transfer capabilities. The particle size can vary within the range of 0.250 to 0.750 inches in size. Where such particles as gravel are used, it has been found that their low thermal conductivity will affect the radial mixing rate in the bed due to the restricted motion of the particles and the low thermal conductivity of the gravels. However, when a packing of silicon carbide particles are used, there is a tendency toward a uniform temperature inside the bed due to the higher thermal conductivity of the silicon carbide packing.

Another variable is the ratio of fixed to fluidized particles. Innumerable combinations of the fixed and fluidized particle weight and volume ratios can be used in the system. However, it has been determined that the best combination of fixed and fluidized particles in the fixed-fluidized bed dry cooling tower is one in which the bed is packed to the height of the fixed particles with smaller size fluidized particles, under non-fluidized condition. There is no free layer of smaller size particles above the fixed particles and vice versa under non-operating condition. This combination provides the lowest pressure drop per unit height of the bed and may be as much as one-third less than the unit pressure drop through a purely fluidized bed. Any increase in height of fluidized particles above the fixed particles, under non-fluidized conditions, will increase the unit pressure drop proportionally toward the value of the purely fluidized bed. This is so inasmuch as a substantial height of fluidized particles above the fixed particles essentially operates as a purely fluidized bed.

A further variable in the fixed-fluidized bed is the physical design of the equipment. The geometrical configuration of the heat exchanger tubes inside the bed is significant in the determination of the pressure drop characteristics in the bed as well as the heat transfer behavior. The entrainment rate and hydrodynamic stability of the bed are also affected by the pattern of the fixed particle arrangement with respect to the heat exchanger tubes.

Lastly, the fixed-fluidized bed involves the variable of the superficial velocity of the air through the bed to effect fluidization of the medium. The maximum pressure drop through the bed is at the point of minimum superficial velocity at which fluidization is achieved. As the superficial velocity is increased, the pressure drop across the fluidized bed decreases. The rate of decrease of back pressure with increase superficial velocity is a function of all of the foregoing variables and must be determined for each particular situation.

The performance characteristics of the fixed-fluidized bed cooling tower described above and shown in FIG. 1 has been determined. The fluidized medium employed was atmospheric air at an input temperature of 75° F. The bed was approximately 8 inches deep and composed of sand and gravel. The smaller particles which were fluidized had a specific density of 162 lbs./cubic foot and a thermal conductivity of 0.188 BTU/hr. sq. ft. F/ft. The fixed particles or gravels were of a similar density and thermal conductivity and were in the range of 0.250 to 0.500 inches in diameter.

A determination of the heat transfer coefficient from the heat exchanger tubes to the fluidized particles and from the fluidized particles to the fluidized medium was made for varying particle sizes as a function of varying superficial velocity. The results are set out in the two tables below:

Table 1 Surface to Particle

VARIATION OF HEAT TRANSFER COEFFICIENT AS A FUNCTION OF SUPERFICIAL VELOCITY; fps. AND PARTICLE SIZE

| Superficial Velocity, fps. | Particle Size, inch. | | |
|---|---|---|---|
| | 0.1 in. | 0.01 in. | 0.001 in. |
| 0.6 | 14.0 | 98.0 | 580 |
| 0.8 | 15.0 | 102.0 | 595 |
| 1.0 | 16.0 | 104.0 | 615 |
| 1.2 | 17.0 | 108.0 | 631 |
| 1.5 | 18.5 | 113.0 | 666 |
| 2.0 | 21.0 | 120.6 | 709 |

Table 2 Particle to Air

VARIATION OF HEAT TRANSFER COEFFICIENT AS A FUNCTION OF SUPERFICIAL VELOCITY AND THE PARTICLE SIZE.

| Superficial Velocity, fps. | Particle Size, inch. | | |
|---|---|---|---|
| | 0.1 in. | 0.01 in. | 0.001 in. |
| 0.6 | 28.2 | 14.10 | — |
| 0.8 | 41.4 | 20.55 | 2.00 |
| 1.2 | 76.0 | 34.81 | 12.00 |
| 1.5 | 112.0 | 46.53 | 23.32 |
| 2.0 | 144.0 | 64.00 | 33.90 |
| 3.4 | 269.0 | 135.00 | 68.00 |

From the above tables, it is apparent that a wide variation in the coefficient of heat transfer is obtainable in the fixed-fluidized bed cooling tower depending upon the superficial velocity and particle size employed. It is to be noted from the tables that, as regards heat transfer from the heat exchanger tubes to the particles, diminishing particle size will increase the coefficient of heat transfer. However, the converse is true as respects the coefficient of heat transfer in the transfer of heat from the particle to the air. Under existing atmospheric conditions, a particle size can be chosen which will optimize both transfer conditions. As regards the superficial velocity, it is apparent that increased superficial velocity increases the coefficient of heat transfer in both the case of transfer from the tubes to the particle and from the particle to the air.

A performance comparison has been determined between the fixed-fluidized bed cooling tower, a purely fluidized bed cooling tower and the conventional dry cooling tower. In this determination, an optimum fluidized particle size of 0.01 inches was utilized and a superficial velocity of 1.5 feet per second. The other variables were maintained as in the example above. The results of the comparison are set out in the table below:

COMPARATIVE PERFORMANCE OF FIXED FLUIDIZED, FLUIDIZED AND CONVENTIONAL DRY COOLING TOWER SYSTEM

| | Fixed Fluidized Bed Dry Cooling Tower | Fluidized Bed Dry Cooling Tower | Conventional Dry Cooling Tower |
|---|---|---|---|
| 1. Heat Transfer Coefficient, Btu/hr. ft.² F. | 50.0 | 60.0 | 5–25* |
| 2. Surface Area Required to Transfer 60,000 Btu/hr.** heat flux., sq. ft. | 24.0 | 20.0 | 48.0 |
| 3. Pressure drop through the dry cooling tower, inch. of water Column | 12–15*** | 30–32*** | 2–5 |
| 4. Pumping Power Required, H.P. | 6.2 | 13.8 | 3.45 |

* Based on the outside surface area of the tube excluding the extended surface.
** Based on the condensation of 62 lbs of steam.
*** Includes the pressure drop through the distributor plate.

From the above description of the invention, it will become apparent that the fixed-fluidized bed cooling tower provides a solution for a practical and efficient fluidized cooling tower. Additionally, the fixed-fluidized bed cooling tower disclosed presents a cooling tower which is greatly more efficient than the conventional dry cooling tower and of a smaller size and less expensive construction.

The foregoing invention has been described in respect to a particular embodiment thereof shown in the drawing and based upon illustrations of specific variables and examples. As a result of the foregoing description, it will be apparent to those skilled in the art that other employed variations in the structure disclosed and parameters recited may be used. It is to be understood that no specific limitation to the scope of the invention is intended by the particular examples and parameters disclosed.

I claim:
1. A dry cooling tower comprising:
a housing including heat exchanger means therein;
a bed of intermixed larger unfluidized particles and smaller fluidized particles; and
means for passing a cooling gas through the bed to fluidize the smaller particles within the interstices of the larger particles and the heat exchanger means to effect heat transfer.
2. In a dry cooling tower of the type employing a housing within which heat exchanger means are disposed and means for passing a cooling gas over the heat exchanger means, the improvements comprising:
a bed of intermixed larger unfluidized particles and smaller fluidized particles.
3. The dry cooling tower of claim 2 wherein the larger particles are in the range of from 0.250 inches or larger and the fluidized particles are in the range of from 0.10 inches in diameter or less.

* * * * *